Jan. 17, 1961 E. LOEB 2,968,602
REACTOR-FLASH BOILER-FLYWHEEL POWER PLANT
Filed Dec. 3, 1959 2 Sheets-Sheet 2

INVENTOR.
Ernest Loeb
BY
Roland A. Goodman
Attorney

United States Patent Office 2,968,602
Patented Jan. 17, 1961

2,968,602
REACTOR-FLASH BOILER-FLYWHEEL POWER PLANT

Ernest Loeb, Silver Spring, Md., assignor to the United States of America as represented by the United States Atomic Energy Commission Filed Dec. 3, 1959, Ser. No. 857,240

2 Claims. (Cl. 204—193.2)

The present invention relates generally to neutronic reactors, and more specifically to neutronic reactors for the production of useful power.

For convenience, conventional power reactors may be classified into two broad groups, those requiring a heat exchanger to produce steam for power, and those where steam is generated in the reactor proper (such as boiling reactors). Both classes, as complete power units, are massive, complicated, cumbersome apparatus, requiring a complex network of piping to convey heat transfer liquid, or steam, or both. Further, they require one or more turbines and associated condensers, as well as a mechanically complicated reactor control system. All vessels and piping that contain fluid that passes or may pass into the reactor must be very heavily shielded due to the high level of acquired radioactivity of the fluid. The reactor vessel must be so shielded in any event. However, the heat exchanger and heat transfer fluid piping must also be heavily shielded in the first class of reactors cited above; in the second class, the boiling reactors, the steam lines, the turbines, the condensers and the water return line must also be shielded, although in this case the level of radiation can be expected to be substantially lowered. If required, a heat exchanger increases the difficulties to be encountered, as it is not readily designed to be both compact and of high capacity. A heat exchanger is difficult to manufacture so that it is free from leaks, and there is difficulty maintaining a fluidtight exchanger in view of the high level of radioactivity of the exchanger after initial use. Even a compact heat exchanger has considerable size, so it will require a large, massive shield.

A simple calculation, based on Standard Steam Tables (Handbook of Chemistry and Physics, Chemical Rubber Publishing Co., 1939 edition) shows that 97.5 cm.$^3$ of steam at 220° C. must flow through a heat exchanger and be cooled to 30° C. water to convey 1000 calories of heat; and 9.75 cm.$^3$ of water at 220° C. will convey the same amount of heat when cooled to 100° C. If one could obtain power directly from water in the reactor, and merely be required to convey water from a condenser back to the reactor at 30° C., the 1000 calories could be accommodated by a flow of 1.56 cm.$^3$. Hence, this simple change would decrease piping size requirements and the shielding required for such piping by a large factor.

In this invention the reactor and turbine are a single unit, in which the reactor functions as the turbine rotor. The reactor control system is extremely simple, requiring only one moving part which is a valve mechanism controlling the water flow to the reactor. This invention achieves the nearest approach to the direct conversion of nuclear to mechanical energy presently known, a minimum size, weight and space requirement, as well as a high degree of simplicity. The compactness attained in this invention accounts for substantial savings in initial cost and, in the case of a mobile unit, similar transportation cost savings. As a mobile unit, this invention has great value in civilian use, such as a power supply for an isolated construction site, as well as great military utility where its weight and space savings as well as its cost savings are important. It makes nuclear power available to small portable equipment installations.

One of the objects of this invention is to provide a device for the production of useful power, either mechanical or electrical, from a neutronic reaction, minimizing auxiliary apparatus needs, as well as weight and space requirements. In this invention, a steam-forming liquid is employed for moderation, i.e., water or heavy water. The neutronic reaction transfers directly much of the energy produced to the liquid, causing steam formation. The thrust of this steam is utilized directly in the production of power.

It is an additional object of this invention to exert control on a reactor by controlling feed water access to the reactor. This may be accomplished automatically by means of a governor activated by the speed of rotation of the turbine.

It is also an object of this invention to provide a relatively inexpensive, readily transportable power generation system, completely self-contained, that can be used in isolated places for either civilian or military applications. In either case the investment would be moderate, such that accidental loss would not be catastrophic.

These objects are achieved in this invention by providing a neutronic reactor whose fuel elements and coolant moderator passages are in the form of a plurality of sections disposed at spaced intervals adjacent to the periphery of a hollow cylinder such that the passages are generally normal to the radius passing through their innermost point. A means of introducing moderator coolant into the hollow cylinder through the shaft is utilized. Coolant moderating liquid is introduced through the shaft and is forced to pass through the core passages by centrifugal force when rotating, whereby the core becomes completely moderated causing heat to be produced in the core which in turn causes the moderator coolant to vaporize, at least in part. The thrust of this vapor, travelling generally tangentially to the cylinder periphery, imparts rotary motion to the whole reactor. Assuming the axis of the hollow cylinder to be horizontally disposed, initial operation of the reactor is achieved by introducing coolant into the cylinder, the liquid flowing downward to moderate the downmost section of the reactor, thereby generating vapor in this section and causing the initial thrust to start the rotation.

Neutronic reactor art and theory, as applied to reactors of the thermal neutron fission process, are set forth in U.S. Patent No. 2,708,656 (Fermi and Szilard) to which reference is made. Additional theoretical treatment is contained in standard textbooks, notably in "The Principles of Nuclear Reactor Engineering" by Samuel Glasstone (D. Van Nostrand Co., Inc., New York, 1955), and "Nuclear Reactor Theory" by Samuel Glasstone and Milton C. Edlund (D. Van Nostrand Co., Inc., New York, 1952).

The invention may be practiced in many embodiments. In the following not only one embodiment of this invention is described, but a particular construction of this embodiment is set forth, complete with engineering specifications.

Figure 4 is a sectional view taken along the line 4—4 of Figure 2;

Figure 6 is a sectional view of the core taken along the line 6—6 of Figure 2; and Figure 7 is a transverse sectional view through one of the fuel elements of the device.

Figure 1:
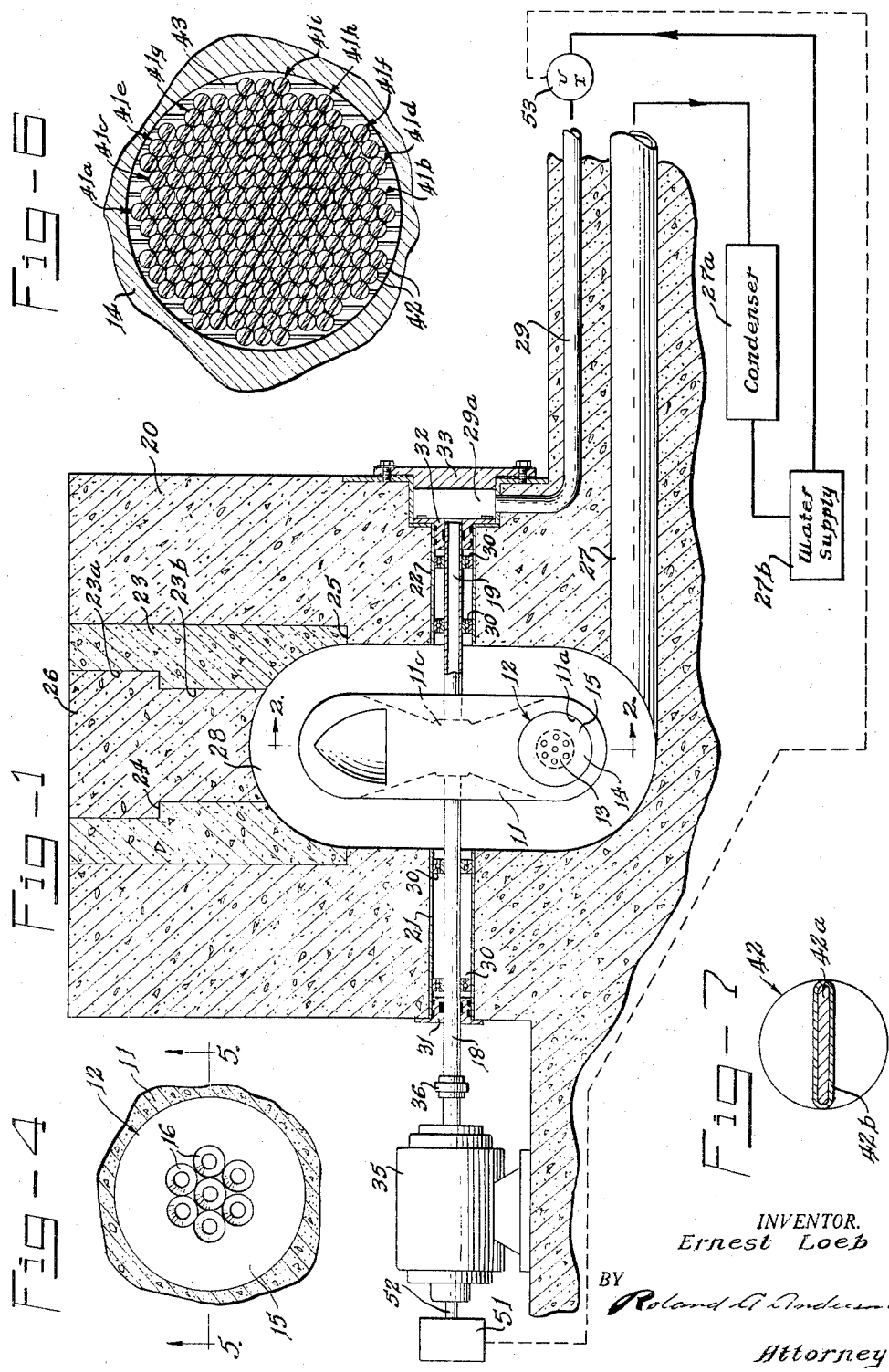
Figure 1 is a vertical sectional view of a neutronic device constructed according to the teachings of the present invention.
Figure 2:
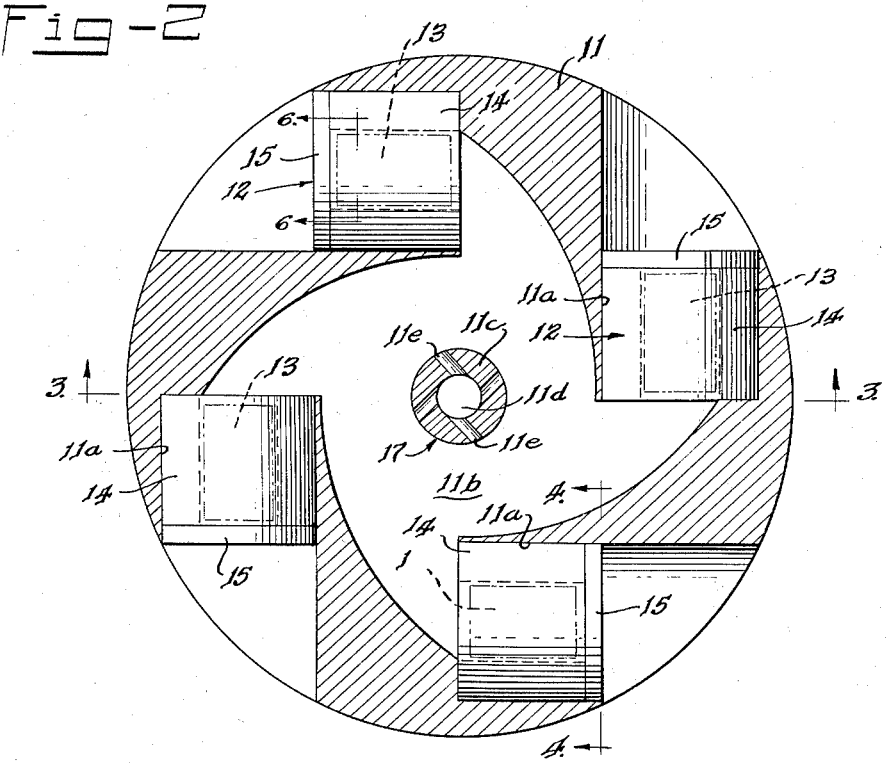
Figure 2 is a vertical sectional view taken along the line 2—2 of Figure 1.
Figure 3:
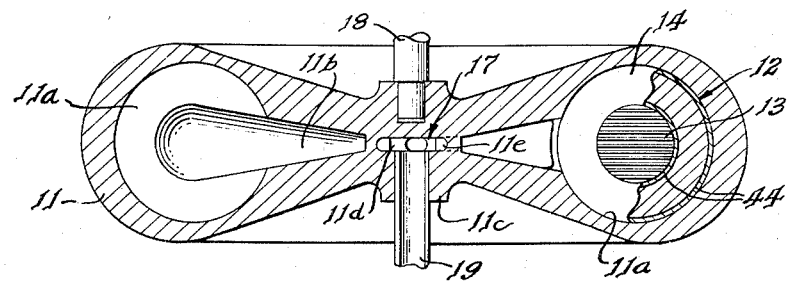
Figure 3 is a sectional view taken along the line 3—3 of Figure 2.
Figure 5:
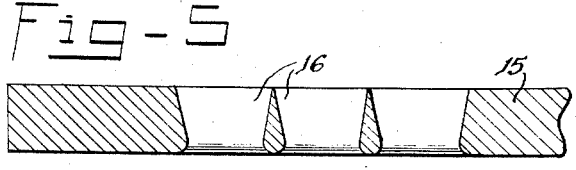
Figure 5 is a fragmentary sectional view taken along the line 5—5 of Figure 4.

In Figures 1 through 6, 11 is a stainless steel impeller member housing four reactor sections 12 disposed adjacent to the periphery of the member 11. The impeller member 11 is in the form of a round disc which has, in the present embodiment, four cylindrical bores 11a extending therein from the periphery of the disc to a cavity 11b disposed about the axis of the member. The axes of the bores are in a common plane and are at an angle of less than 90° with the periphery. A hub 11c extends through the member 11 coaxially therewith, and the hub 11c has an axial cylindrical opening 11d therein. A plurality of channels 11e extend through the hub 11c generally tangent to its inner cylindrical surface. Each reactor section 12 contains a reactive core 13, encased about its circumference in a cylinder 14 of beryllium forming the reflector. The surface of the reactor section 12 nearest the periphery of the housing 11 is covered by a stainless steel nozzle plate 15. This nozzle plate 15 has a plurality of conical holes 16 bored therethrough and is so positioned against the top face of reactor 12 that the larger diameter of holes 16 is away from said reactor face. The hub 11c at the center of the impeller member 11, and preferably integral with it, forms a water distribution member, designated 17, which is cored to receive a solid shaft 18 and apertured to receive an aligned hollow shaft 19. The shafts 18 and 19 are disposed on the axis of the impeller member 11 and extend outwardly therefrom on opposite sides of the impeller member 11.

The impeller member 11, together with shafts 18 and 19, is positioned into a cavity 28 in a housing shield 20, preferably a monolith of high strength concrete, which may have other material added to increase its density. This housing shield 20 is fitted with a hollow bearing tube 21 to accommodate the solid shaft 18 and a second hollow bearing tube 22 to accommodate the hollow shaft 19, tubes 21 and 22 being preferably placed in position at the time of casting shield 20, such as to cause a sufficiently close juxtaposition of shield 20 and tubes 21 and 22, that leakage of fluid is effectively prevented. Housing shield 20 is so formed as to accommodate a rotor access plug 23, in the form of a hollow cylinder of high density material with a bore 23a, a counterbore 23b, and a shoulder 24 at right angles to the axis of the bores. A second shoulder 25 is provided in shield 20 to support plug 23. A reactor access plug 26, so shaped as to conform to the opening in rotor access plug 23, rests on shoulder 24 thereof. When the plug 23 is removed the entire impeller member 11 may be removed, and when plug 26 only is removed, and the impeller member 11 angularly positioned such that one of the reactor sections 12 confronts the bore 23b, that reactor section may be removed.

The housing shield 20 also contains a water-steam outlet line 27 communicating between a condenser 27a and the bottom of the cavity 28 in the shield 20 of suitable size as to allow freedom of rotation to the impeller member 11. A water supply source 27b and high pressure metering pump are connected to the condenser 27a. Housing shield 20 also contains a water inlet line 29 for water, said line opening through an enlarged portion 29a of the bearing tube 22. The line 29 is also connected to the water source 27b.

Shafts 16 and 17 are rotatably positioned in the bearing tubes 21 and 22 by bearings 30. Bearing tubes 21 and 22 are sealed against leakage of fluid by packing glands 31 and 32. The inlet water passage is sealed closed by sealing a cover plate 33 into the enlarged exterior portion 29a of bearing tube 22. The solid shaft 18 is connected to a generator 35 by means of a shaft coupling 36 such that the axis of generator 35 is coincident with that of shafts 18 and 19.

Each reactor core 13 comprises a plurality of elongated parallel fuel elements 42 disposed adjacent to each other. Each of the fuel elements 42 is in the form of a narrow strip which is axially twisted according to the teaching of a copending application of Breden and Schultz, Serial No. 475,319. Each of the strips has a core 42a and a protective jacket 42b. In this construction the ribbon cores 42a are fabricated of uranium-beryllium alloy, containing 5.55 weight percent of uranium (or approximately 17 times as much beryllium as uranium by weight), the uranium being enriched in the thermal neutron fissionable isotope $U^{235}$ to contain approximately 90% by weight $U^{235}$. The jacket 42b consists of zirconium. The core 42a of the ribbon, before twisting, is a strip 14 inches long, 0.090 inch thick and 0.647 inch wide. The alloy strip is converted to the twisted ribbon fuel element by placing a zirconium strip 1 inch long by 0.090 inch thick by 1 inch long on each end, so as to form a continuation of the fuel core, encasing the whole in a continuous sheath of zirconium 0.010 inch thick, and twisting so as to retain a twist of 720° with the torque released.

The fuel elements 42 are made into subassemblies, designated 41a, 41b, 41c, 41d, 41e, 41f, 41g, 41h and 41i, on Figure 6, 41a being the central assembly and the other assemblies being disposed on each side thereof in alphabetical order. The fuel element assemblies are formed by securing both ends of a plurality of fuel elements 42, side by side to strips 43 which are mounted to the cylinder 14, the ribbon ends of all of the fuel elements being coplanar. The strips 43 are of 0.100 inch by 0.250 inch zirconium.

Fuel assembly 41a contains 15 fuel elements 42, assembled on a zirconium strip 10 inches long, forming an axial plane of the reactor 12. On each side of assembly 41a are the two subassembleis 41b of 14 fuel elements. In like manner subassemblies 41c, 41d, 41e, 41f, 41g, 41h, and 41i are disposed parallel and adjacent to each other and contain 14, 13, 13, 12, 9, 8, and 3 fuel elements, respectively. All of the subassemblies are disposed in contact with each other with these axes equally spaced from each other in a triangular array.

The entire reactor core 13 is disposed in the reflector 14 which is a hollow cylinder of beryllium of 20 inches outer diameter, 10 inches inner diameter, 16 inches long. The reflector partially, but not completely moderates the core, but the reactor requires the admission of water to become completely moderated. The reflector 14 is constructed of beryllium and is provided with a casing 44 of zirconium .010 inch thick in order to prevent reaction of the beryllium with water.

Engineering and operating data for each core is given below.

Core dimensions:
    (1) Length—14 in.
    (2) Diameter—10 in.
Reflector—5 in. Bé.
Critical mass—1.8 kg. $U^{235}$ per core.
Change in reactivity from cold to operating $$\frac{\Delta K}{K} = .09$$

Percent moderation without water=20.
Power density kw./liter of core volume=860.
Thrust=8,200 lb.
Percent steam by weight leaving reactor=50.
Lb. steam per sec. leaving reactor=40.
Heat release rate=238,000 B.t.u./ft.² hr.
Total heat transferred=15,000 B.t.u./sec.
Heating surface=ribbons.
Number of flow passes=1.

Pressure leaving reactor=1,500 p.s.i.a.
Pressure drop through reactor=27 p.s.i.
Water temperature entering reactor=80° F.
Water velocity entering core=6 ft. per sec.
Velocity of mixture leaving core=95 ft. per sec.
Velocity leaving expansion nozzle=1,820 ft. per sec.
Peripheral velocity at maximum=1,320 ft. per sec.
Area of expansion nozzle throat=3.8 sq. in.
Angle of expansion on nozzle outward from throat=7°.
Largest radius of impeller periphery=48 in.

The pump of assembly 27b is capable of operating at very high pressures, so as to be able to overcome the back pressure on the water intake to the reactors due to a maximum nozzle pressure of 1500 p.s.i. The pump of 27b is also capable of fine adjustment of its discharge rate so as to regulate the flow of water through the cores and thereby the reactivity which, in turn, regulates power output. This volume control also is used to overcome the effects of water pressure due to centrifugal force when the rotational speed of the device changes. However, these effects are minor as compared to the back pressure on the water from the steam at its outlet.

The tortuous path for the water because of the twist in the fuel elements creates a larger pressure drop to be overcome by the water pressure. This effect, the velocity of the water and the resistance to steam slip, tends to prevent steam from being displaced inwardly by centrifugal forces.

An optional improvement in this invention is made by placing a governor 51 on the unconnected end shaft 52 if the generator 35, capable of actuating a throttle valve 53 on the water inlet line 29, making the water supply, and concomitantly the reactivity, responsive to the speed of rotation of the generator, thereby increasing the sensitivity of the control over the speed of rotation of the generator 35.

From the foregoing disclosure, a man skilled in the art will readily devise many modifications and embodiments of the reactor, one of whose embodiments has been described, and still be retained within the scope of the present invention. It is therefore intended that the scope of the present invention be not limited by the illustrative embodiment in the foregoing disclosure, but rather only by the appended claims.

What is claimed is:
1. A device for generating rotational power comprising an impeller in the form of a round disc including a central hub which houses four cylindrical reactors located in four cylindrical bores having their axes extending in a common plane from the periphery of the disc at an angle of less than 90° with the periphery to an annular cavity located about the hub of the impeller, a solid shaft and a hollow shaft coaxial therewith extending in opposite directions from the hub of the impeller, said hollow shaft being in communication with the annular cavity, said cylindrical reactors each comprising a core consisting of parallel elongated fuel elements defining a plurality of fluid passages therebetween, a hollow cylindrical reflector of beryllium enclosing the fuel elements, and a nozzle plate on the portion of the reactor nearest the impeller periphery, said fuel elements being constructed of enriched uranium alloyed with approximately 17 times its weight of beryllium, said reactor being subcritical in the absence of steam-forming liquid, means for supplying steam-forming liquid under pressure through said shaft to said impeller, and means for controlling the rate of ingress of steam-forming liquid, whereby the entrance of water to said reactors causes them to attain criticality and steam to be produced by the concomitant nuclear reaction, thereby generating a thrust with a tangential component resulting in rotation of the impeller, upon the escape of said steam through the nozzle plate of each reactor.

2. A device according to claim 1 wherein said hollow shaft is in communication with the annular cavity by means of a plurality of channels extending through the hub generally tangent to the opening in the hollow shaft and the nozzle plate has a plurality of conical holes bored therethrough and is so positioned against the reactor that the larger diameter of the holes is away from the reactor.

References Cited in the file of this patent
FOREIGN PATENTS 754,559  Great Britain _____ Aug. 8, 1956

OTHER REFERENCES

Smith et al.: "Applied Atomic Power," 1946, pp. 134, 135. (Copy in Div. 46.)